UNITED STATES PATENT OFFICE.

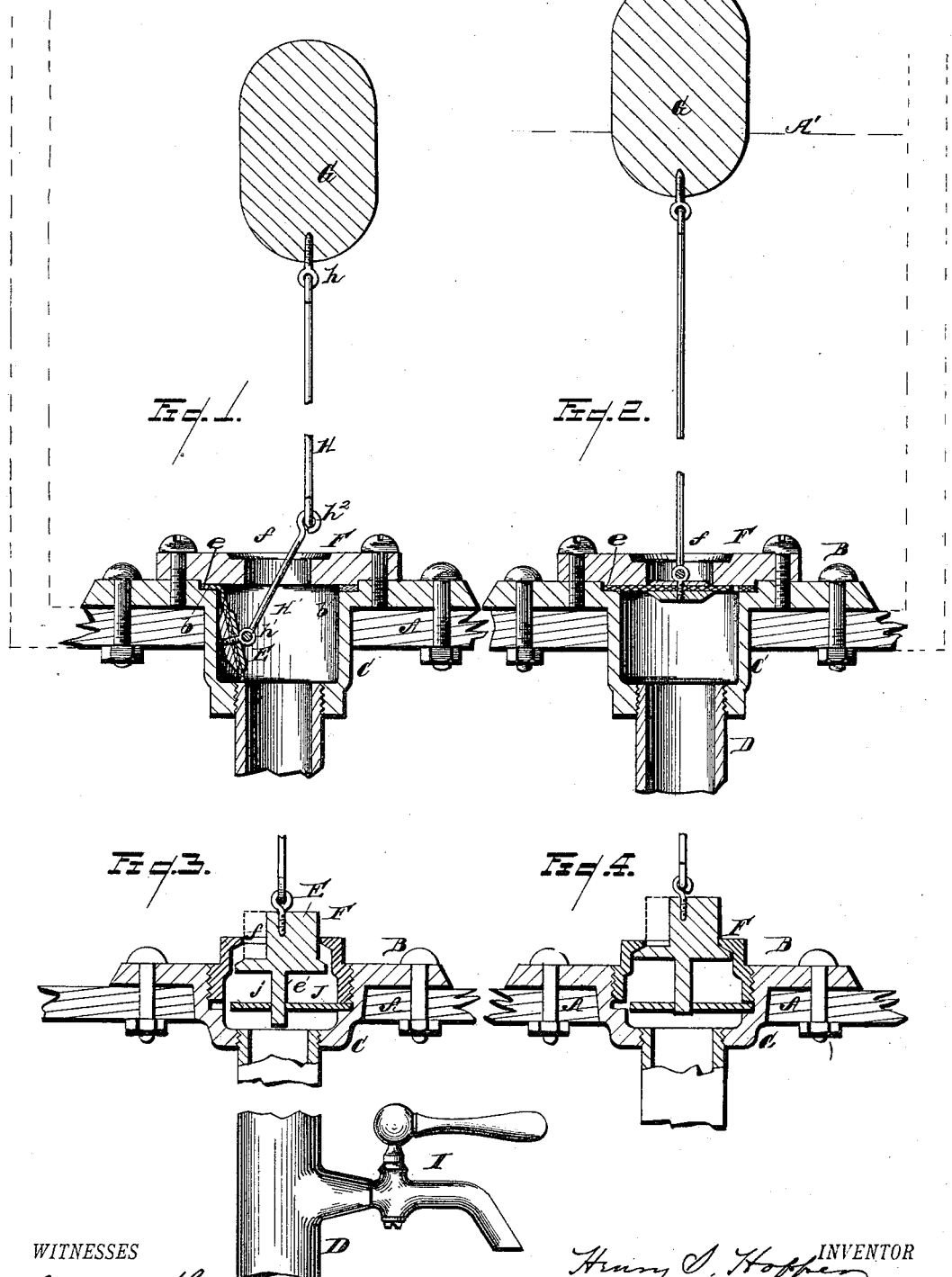

HENRY S. HOPPER, OF DETROIT, MICHIGAN.

WATER-TANK VALVE.

SPECIFICATION forming part of Letters Patent No. 362,963, dated May 17, 1887.

Application filed August 12, 1885. Serial No. 174,206. (No model.)

*To all whom it may concern:*

Be it known that I, HENRY S. HOPPER, of Detroit, county of Wayne, State of Michigan, have invented a new and useful Improvement in Water-Tank Valves; and I declare the following to be a full, clear, and exact description of the same, such as will enable others skilled in the art to which it pertains to make and use it, reference being had to the accompanying drawings, which form a part of this specification.

My invention has for its object a novel valve for water-tanks, designed to be self-closing and cut off the admission of water to the tank when suitably filled, and thereby prevent overflowing, and which shall at the same time allow the water to be drawn from the tank by the same pipe through which it is admitted to the tank.

It consists of the combinations of devices and appliances hereinafter specified, and more particularly pointed out in the claims.

In the drawings, Figure 1 is a sectional view illustrating my invention, showing the valve open. Fig. 2 is a similar view showing the valve closed. Fig. 3 is a modification showing the valve partially open. Fig. 4 is a view of the same, showing the valve closed.

I carry out my invention as follows: A represents the base of the tank; A', the water-level therein.

B is a bed-plate attached to the base of the tank, and supporting a valve-case, C, which may be integrally or otherwise connected therewith.

D represents a pipe communicating with the valve-case, and through it with the interior of the tank when the valve therein is opened.

E represents a valve closed against a valve-seat, F, which I prefer should be separably connected with the valve-case for convenience of locating the valve in place. $f$ is an orifice in the valve-seat. The valve may, as shown in Figs. 1 and 2, be hinged or flexibly engaged in the valve-case at one edge, so as to open or close said orifice. It is convenient to engage the flexible end $e$ of the valve in a recess in the valve-case, as shown at $b$, where it may be secured firmly in place by the valve-seat, which may be bolted upon the bed-plate B. The bed-plate itself may be secured to the base of the tank by the same or by an additional bolt, as may be preferred. The valve is governed by means of a float, G, connected therewith by rods H H' and eyebolts $h\ h'$, as shown in Figs. 1 and 2, and the rods H H' may be flexibly connected, as shown at $h^2$.

I designates a faucet in the pipe D, for drawing water therefrom.

The operation of my apparatus is as follows: The faucet I being closed and water admitted from the source of supply through pipe D into the tank, it will rise therein until the float has been reached. At this moment the float will begin to rise, carrying with it the valve E. As the float and valve continue to rise, the pressure of the fluid in the pipe will act against the under side of the valve and aid in its upward movement, the pressure against the valve becoming greater as the valve-opening becomes more contracted. When the valve is seated, it will be held in its closed position by the pressure of the water in the pipe D, and as long as this pressure is maintained the valve will remain closed. If the faucet I now be opened, the pressure in pipe D will be relieved, the valve E will be opened, and the water from the tank will flow through the faucet till it is again closed, when the water will rise in the tank, raise the float and valve, and the operation be repeated.

The valve may be made to close against the under side of the valve-seat in any desired manner and controlled in its movement by the float G, connected therewith, and I would have it understood that I do not limit myself to any definite construction and arrangement of the valve in the case, as I contemplate any suitable valve governed by a float in the tank attached to open and close against the valve-seat, so that water may enter and be withdrawn from the tank through one and the same pipe. For instance, as shown in Figs. 3 and 4, the valve, instead of being hinged at one edge or flexibly connected thereat, may be provided with a guide-stem, $e'$, reciprocatory in the aperture in a shield, J, as shown at $j$.

When the water is low in the tank, it is evident that the valve will rest upon the shield J, the construction being such that the water may flow freely around the edges of the shield and valve and through the orifice $f$ in the valve-seat and into the tank. This it will continue to do until the tank becomes so nearly filled that the float will lift the valve from the shield toward the seat F. When it has raised it a suitable distance from the shield, it will of course offer considerable resistance to the flow of the water, and will be carried to its seat independently of the float, which, being relieved of a corresponding weight, will be raised a corresponding distance above the water-level. In this position the valve closes all communication between the pipe D and the tank, where the valve is held until the pressure in the pipe is reduced by drawing off the water, or otherwise. After water has been drawn off, the weight of the valve falls on the float again, causing it to fall from its position above the water-level to which it had been raised by the pressure of the water upon the under side of valve, as before described, thus causing the valve to be slightly opened, when the pressure of the water in the tank will open the valve to its fullest extent and allow the water to escape into the pipe D, and with the rise of the float will return to its seat, as shown in Fig. 4. Of course with the lowering of the float the valve will settle back toward or upon the shield J, permitting the water to be withdrawn, if desired, or to be forced into the tank, as the case may be. It is obvious that a valve so located and so controlled affords a perfect automatic valve, obviating the necessity of two separate pipes, the one pipe D answering both as an inlet and exit pipe, while at the same time the valve prevents the tank from overflowing.

$b'$ represents any suitable packing between the valve-case and the valve-seat, if desired. The valve-seat F being separable from the case, the shield J may be readily located in place, as shown in Figs. 3 and 4. Any suitable check-valve may be engaged with the float for this purpose.

It is evident that if a valve such as is employed in Figs. 1 and 2 is employed the case must be so constructed as to permit the valve to fall back out of reach of the water forced into the tank through the pipe D until the water has risen so as to partially elevate the valve. It is also obvious that the shield J, in the form shown in Figs. 3 and 4, will prevent the pressure of the water from forcing the valve against the seat until the water has risen sufficiently to cause the float to lift the valve from said shield.

What I claim is—

1. The combination, with a tank having in its lower portion a valve-case provided with a valve-seat, of a valve closing against said seat, a float connected with said valve, a single pipe communicating with the valve-case and with the source of supply, and an exit to said pipe intermediate of said points, substantially as described.

2. The combination, with a tank, of a valve-case engaged therewith, a pipe communicating with the interior of said case, a valve-seat separably connected with said case, and a valve provided with a float connected therewith and arranged to open and close communication between the case and the tank, the construction being such that the water may enter and be withdrawn from the tank through a single pipe, substantially as described.

3. The combination, with a tank, of a valve-case provided with a pipe communicating therewith, an open valve-seat, and a valve connected with a float and arranged to close against the under side of the valve-seat, the construction being such that the valve will be automatically closed to prevent overflow, and that the water may find its entrance into the tank and exit therefrom through said valve-case and pipe, substantially as described.

In testimony whereof I sign this specification in the presence of two witnesses.

HENRY S. HOPPER.

Witnesses:
N. S. WRIGHT,
M. B. O'DOGHERTY.